United States Patent [19]

Clayson

[11] 4,121,496
[45] Oct. 24, 1978

[54] GUN POD STATIONARY BLAST DIFFUSER

[75] Inventor: Arthur E. Clayson, Inyokern, Calif.

[73] Assignee: The United States of America as represented by the Secretary of the Navy, Washington, D.C.

[21] Appl. No.: 792,948

[22] Filed: May 2, 1977

[51] Int. Cl.² .................... B64D 7/06; F41F 17/12
[52] U.S. Cl. ............................ 89/37.5 R; 89/14 C
[58] Field of Search ................. 89/12, 14 C, 37.5 R

[56] References Cited

U.S. PATENT DOCUMENTS

| 2,787,194 | 4/1957 | Peterson | 89/14 C |
| 2,898,811 | 8/1959 | Helble | 89/12 |
| 3,520,226 | 7/1970 | Meadows | 89/14 C |

*Primary Examiner*—Stephen C. Bentley
*Attorney, Agent, or Firm*—R. S. Sciascia; Roy Miller

[57] ABSTRACT

A stationary blast diffuser for a Gatling type gun incorporating a ball bearing gas seal at the front of the barrel cluster, resulting in a reduced dispersion pattern, the ball bearing gas seal being configured to allow the barrel cluster to rotate and reciprocate with respect to the rigid support structure.

1 Claim, 3 Drawing Figures

GUN POD STATIONARY BLAST DIFFUSER

BACKGROUND OF THE INVENTION

1. Field of the Invention

Aircraft guns such as the 20 millimeter Gatling type gun mounted in a gun pod create high blast pressure levels in the vicinity of the firing barrel muzzle. When the pod is mounted on aircraft, such as helicopters and light aircraft, structural damage to the air-craft may occur on firing. Also, if the aircraft carries avionics which requires a radome in the forward fuselage and a Gatling type gun is positioned in the forward fuselage beneath the radar, the repeated shock waves created by firing the weapon can have an adverse effect on the relatively frangible hardware of the radar system. In addition, gun installations located forward of the jet engine inlet ducts frequently cause engine operational problems such as compressor stall or engine flameout when the weapon is fired at moderate to high altitudes. The engine problems are related to interruption of the airflow due to pressure and/or temperature changes to the normal air inlet flow of the engine caused by the fireball which occurs upon firing.

2. Description of the Prior Art device, pressure resulting

Presently, the gun pod in use has a blast shield that can be rotated in relation to the pod to shield adjacent structure from blast pressure. However, this is only partially effective and a blast diffuser has been added to the barrel cluster. This device, which attaches to the muzzle of the individual barrels, rotates with the rotary barrel Gatling type gun. The combination of a diffuser with a shield is very effective in blast presure reduction. However, the heavy weight and possible unbalance resulting from the diffuser at the end of the barrel cluster causes deflection and whipping of the barrels, reslting in increased projectile dispersion and failure of the floating gas seal. If the diffuser weight is reduced, the life of the diffuser is very short, resulting in frequent required replacement thereof.

A prior art gun blast stripper and diffuser is illustrated and described in U.S. Pat. No. 3,670,622. FIG. 4 of the patent fairly illustrates the device which incorporates a stripper 25 provided on the end of each gun barrel 26. The gun involved is a Gatling type gun and both rotates and reciprocates upon firing. Positioned around the gun cluster is the remaining portion of the apparatus which might be referred to as a blast shield. The blast hood and diffusion stripped of the patent direct the energy produced by firing the guns away from the inlet ducts of the jet engine on the aircraft and eliminate the problem of engine flameout during high altitudes and high angle of attack while firing the guns. However, the strippers mounted on the individual gun barrels produce increased projectile dispersion due to the whipping of the gun barrel on firing.

SUMMARY OF THE INVENTION

The present invention comprises a stationary blast diffuser fixed to the gun pod. The front of the barrel cluster of the Gatling type gun is captured by a ball bearing gas seal. The barrel clamp and sleeve are attached to the gun barrel muzzle with a standard clamp nut and bolt. The outer diameter of the sleeve which rides on the inner ring of the bearing assembly turns with the gun. During gun recoil, the sleeve slides in the bearing inner ring. The bearing mounts support the ball bearings and absorb gun rotation and firing lateral loads. The combination of the ball bearing cluster results in a reduced dispersion pattern and makes possible an efficient stationary blast diffuser. The configuration of the inner ring and retainer provide a labyrinth seal preventing gun gas passage through the bearing.

The blast diffuser consists of a blast tube mounted in an expansion chamber. High pressure gas is stripped off as the projectile travels down the blast tube through a series of ports in the perimeter of the blast tube. The gas then expands in the chamber and exhausts on the lower quadrant thereof through large holes at a low pressure.

DESCRIPTION OF THE PREFERRED EMBODIMENT

Figure 1:
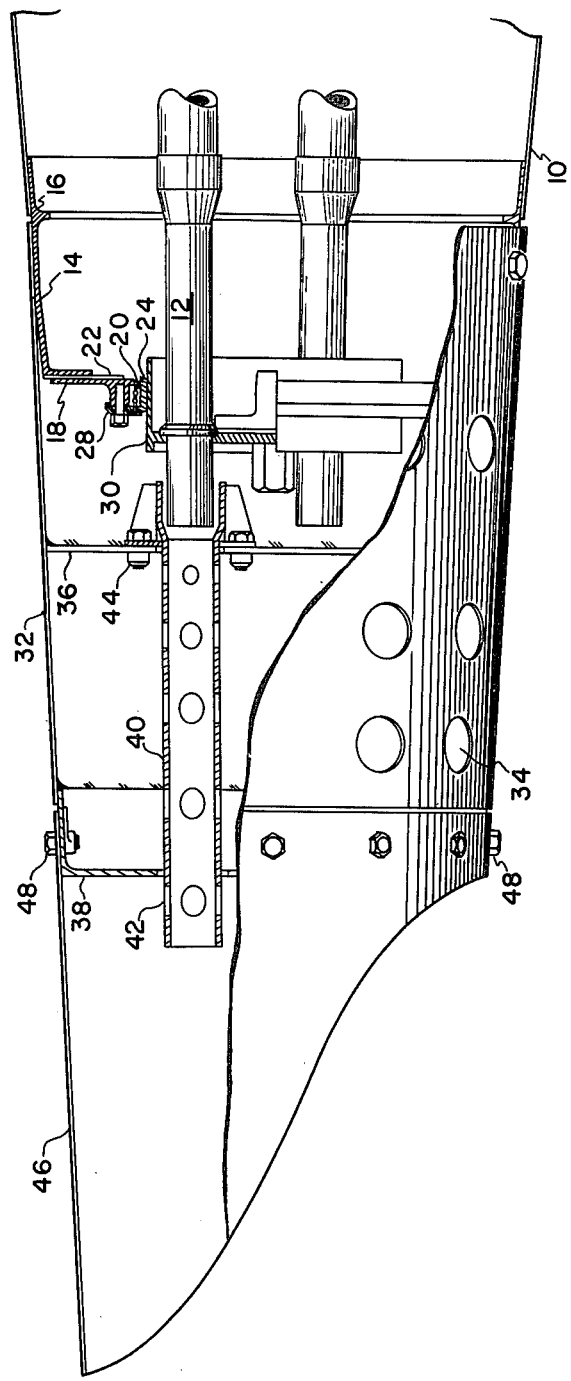
FIG. 1 is a partial cross section of the preferred embodiment of the invention.

FIG. 1 illustrates a preferred embodiment of the invention wherein a gun pod forward fairing 10 encloses the gun firing barrels 12, in this case an M197 20 millimeter Gatling type gun. A forward ring 14 is attached to the forward end of the gun pod forward fairing 10 and has an inner stiffener member 16 extending circumferentially around the inside thereof. Bolted to the forward flange of the forward ring 14 is a seal support 18 having an inwardly extending portion which acts as the outer ring for a bearing 20. A ring plate 22 is clamped between the forward flange of the forward ring 14 and the inwardly extending portion of the seal support 18. The ring plate 22 is necessary only if retro-fitting existing pods. It would not be necessary for new applications.

The outer race of the bearing 20 is supported by the seal support 18 while the inner race is supported by inner ring 24. Retaining ring 26 which is positioned in a groove in the inner ring 24 prevents longitudinal movement of the bearing in a rearward direction. Retainer 28 which is bolted to the seal support 18 has an inwardly extending portion which prevents longitudinal movement of the bearing in the forward direction.

Figure 3:
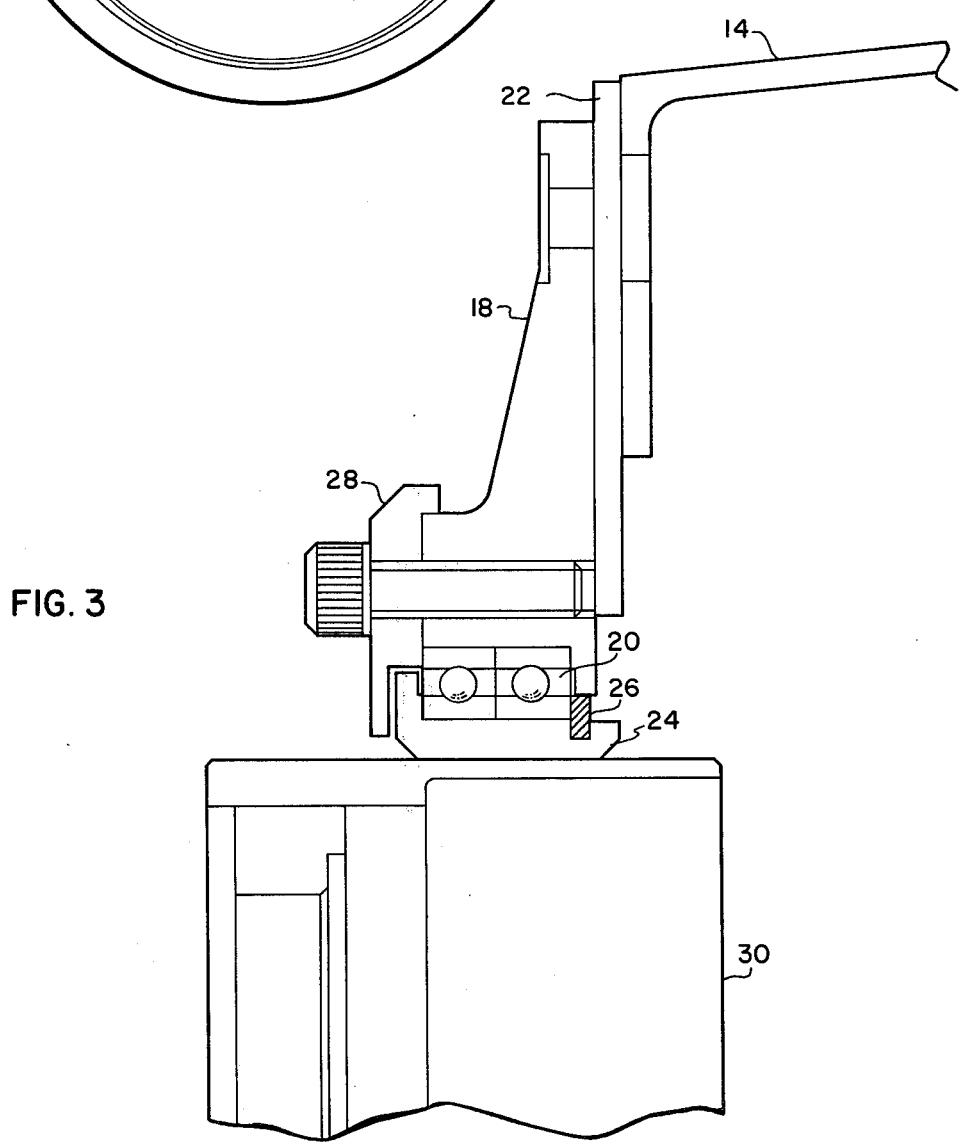
FIG. 3 is a partial cross section of the barrel clamp assembly and support structure.

The forward ends of the Gatling type gun barrels are clamped rigidly in a barrel clamp and sleeve structure 30 which is shown in greater detail in FIG. 3.

An expansion chamber 32 surrounds the entire assembly and is supported at the rearward end thereof by the forward ring 14. The expansion chamber 32 has vent holes as at 34 in the lower portion thereof to allow blast gas to escape therefrom. Positioned approximately midway along its length in the interior of expansion chamber 32 is an aft plate 36. Welded to the forward end of the expansion chamber 32 is a forward plate 38.

Supported in a cutout in the aft plate 36 and the forward plate 38 is a blast tube 40 having holes as at 42 therein. The blast tube 40 is bolted to the aft plate 36 by bolts indicated as at 44. The blast tube has a rearwardly extending portion which is slightly belled to accomodate the diameter of the forward end of the barrel on the Gatling type gun.

A blast shield 46 having a duck-billed shape is bolted to the forward plate 38 by bolts as at 48.

Figure 2:
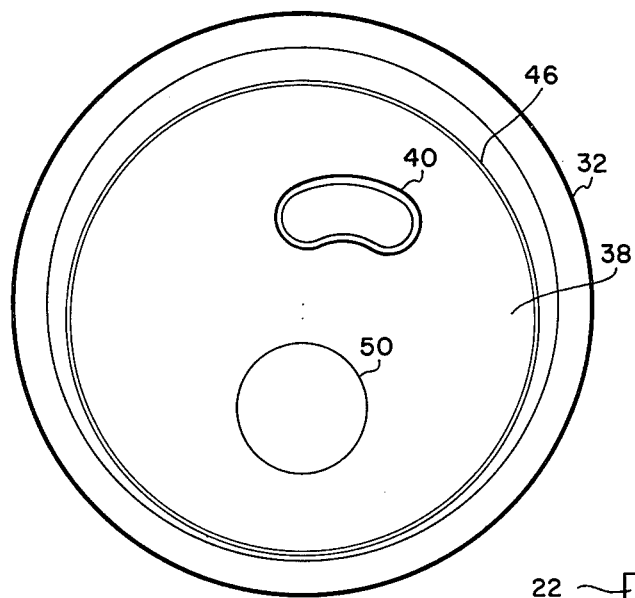
FIG. 2 is a front elevation view looking into the blast shield.

FIG. 2 is a front elevation view of the blast shield and shows the blast shield 46, expansion chamber 32 and the forward plate 38. The forward plate 38 has a hole configured therein to accomodate the blast tube 40 which is elongated in the direction of movement of the individual barrel of the Gatling type gun. Also appearing in the forward plate 38 is a cylindrical opening 50 which allows ram air to enter the expansion chamber 32 during flight.

The barrel clamp and sleeve and gas seal assembly is shown in greater detail in FIG. 3 wherein the numbering corresponds to the numbering in FIG. 1.

FIG. 2 illustrates the blast tube 40 elongated in the direction of gun rotation to allow the projectile free passage while allowing for gun ignition timing to vary from gun bolt lock to bolt unlock. This is required since the individual barrels fire while the barrels are rotating. The elongation of the blast tube reduces the effectiveness of the gas stripping action which results in some high pressure gases exiting the forward end of the blast tube. To completely reduce pressure effects on aircraft structure, the blast shield 46 is used. The shield can be rotated at 30° increments so that it can be adjusted to protect the aircraft as needed in differing installations.

While the Gatling gun is firing, the barrel clamp and sleeve assembly rides on the inner ring 24 of the bearing assembly thereby allowing the barrel clamp and sleeve 30 to rotate with the gun barrels. The entire bearing mount supports the ball bearings and absorbs gun rotation and firing lateral loads.

This configuration provides outboard support for the ends of the individual barrels of the Gatling type gun thereby preventing whip of the barrels and thereby reducing the dispersion pattern of the projectiles. The barrel clamp and sleeve assembly acting in conjunction with the seal support 18, retainer 25, inner ring 24 and the forward ring 14 also provides a labyrinth seal through the bearing.

During firing, high pressure gas is stripped off as the projectile travels down the blast tube 40 through the series of ports 42 in the perimeter of the blast tubes. The gas expands in the expansion chamber 32 and exhausts on the lower quandrant thereof through large holes 34 at a low pressure.

What is claimed is:

1. A gun pod stationary blast diffuser for deflecting gun blasts from an aircraft mounted gun having a plurality of rotating barrels comprising;
    a barrel clamp assembly affixed to the forward end of the plurality of rotating barrels and adapted to recoil and rotate with the barrels;
    support means fixed to the forward end of the gun pod;
    bearing means intermediate said support means and said barrel clamp assembly to allow said barrel clamp assembly to rotate and reciprocate with respect to said support means;
    a blast tube in firing communication with a gun barrel when a barrel is in firing position and having an inner diameter approximating the outer diameter of the barrel;
    said blast tube extending forwardly of the gun barrel in firing position and having holes therein spaced about the periphery and longitudinally thereof;
    a blast shield extending forwardly of said blast tube;
    perforations in an intermediate portion of the blast shield at the lower portion thereof remote from the aircraft skin;
    a forward plate interior of said blast shield and supporting the forward end of the blast tube;
    a ram air opening in the lower portion of said forward blast to allow ram air to enter the intermediate portion of the blast shield;
    the interaction of said blast tube, blast shield and ram air being such that muzzle blast gas is stripped from the blast tube and dissipated in the open air so that the blast diffuser functions to protect the aircraft skin from overpressure and decrease the fireball.

* * * * *